June 3, 1924.　　　　A. W. RAMSEY　　　　1,496,599

VALVE OPERATING MECHANISM

Filed Oct. 5, 1922

Inventor
A. W. Ramsey,

By
Attorney

Patented June 3, 1924.

1,496,599

UNITED STATES PATENT OFFICE.

ALBERT W. RAMSEY, OF DUPONT, INDIANA, ASSIGNOR TO WILLIAM DEXTER SMITH BRACE, OF MAYVILLE, NEW YORK.

VALVE-OPERATING MECHANISM.

Application filed October 5, 1922. Serial No. 592,509.

*To all whom it may concern:*

Be it known that ALBERT W. RAMSEY, a citizen of the United States of America, residing at Dupont, in the county of Jefferson and State of Indiana, has invented new and useful Improvements in Valve-Operating Mechanism, of which the following is a specification.

The object of the invention is to provide a simple and efficient means in the form of an attachment or accessory for use in connection particularly with motor-driven vehicles of the Ford type for the purpose of actuating the pet cocks of the transmission case without resorting to the common expedient of manually turning the same, and more particularly to provide a pet cock actuating device for use in connection with cars of the type indicated whereby a selective opening of the upper and lower pet cocks respectively for testing and drainage purposes may be effected without reaching under the car and therefore without the inconveniences ordinarily attendant upon this operation; and with these objects in view the invention consists in a construction and combination of parts of which a preferred embodiment is shown in the accompanying drawings, wherein:—

Figure 1:
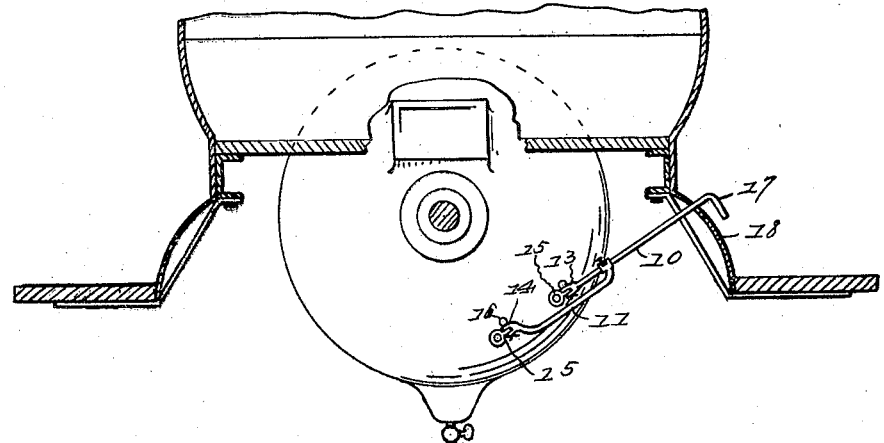
Figure 1 is a side view of a pet cock actuating device embodying the invention applied in the operative position to the vehicle.
Figure 2:
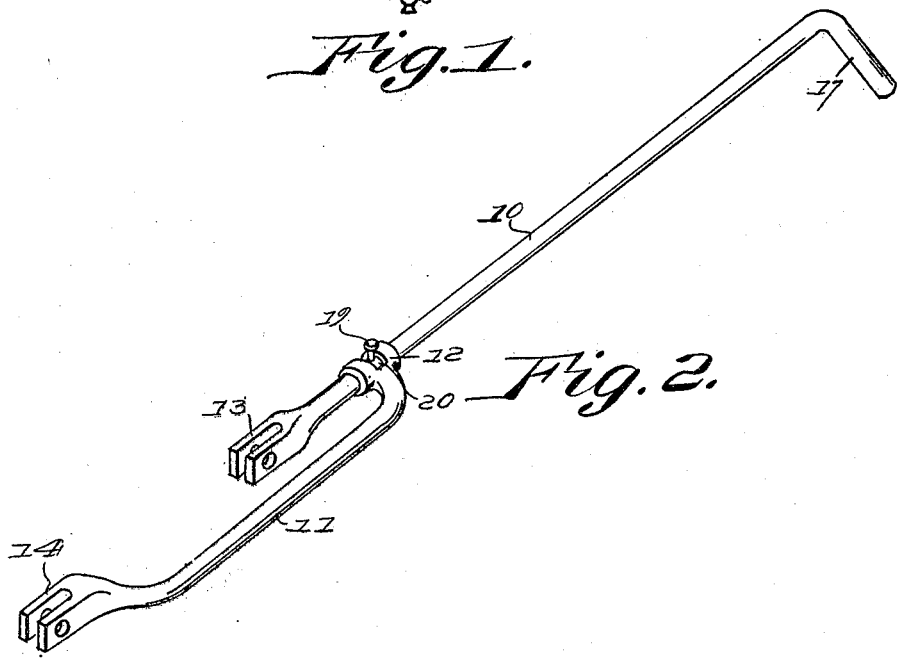
Figure 2 is a detail view of the tool detached.

The device consists essentially of a sectional operating rod comprising the main member 10 and the supplemental member 11, of which the former has a swivel connection with the latter by being mounted in the bearing sleeve 12 at the outer end of the member 11, the members being provided at their inner ends with jaws 13 and 14, or the equivalents thereof for engagement with the pet cock plug and being adapted for attachment thereto under conditions providing against accidental or surreptitious displacement to the end that the device may remain permanently in position on the vehicle while obviously being subject to removal when required.

In the construction illustrated the jaws consist of slit heads for receiving the pet cock turning plugs 15, and split keys 16 or the equivalents thereof are extended through perforations in the jaws and the pet cock plugs for locking the same in place.

The main member of the operating rod is provided with a terminal operating handle 17 which is adapted to be located outside of the running board shield 18 through which the stem rod may be extended by providing the same with a suitable opening.

The swivel connection between the members of the operating rod preferably provides for a limited independent rotary movement of the main member with relation to the supplemental member and to this end the main member carries a pin 19 operating in the slot 20 in the sleeve 12 so that by rotating the main member of the device in one direction the upper pet cock may be opened to test the level of the oil in the transmission case whereas by turning the said main rod in the other direction from the neutral point the motion thereof will be communicated through the contact of the stop pin 19 with the end of the slot to the auxiliary rod member to simultaneously turn both pet cocks so that drainage of the transmission case may be effected.

Having described the invention, what is claimed as new and useful is:—

1. A tool for the purpose indicated having a sectional operating rod comprising main and supplemental members provided at their inner ends with means for engaging the upper and lower pet cocks of a transmission case, the main member of the said operating rod having a limited swivel connection with the supplemental member by which one or both of the pet cocks may be actuated by motion applied to the former.

2. A tool for the purpose indicated having a sectional operating rod comprising main and supplemental members provided at their inner ends with means for engaging the upper and lower pet cocks of a transmission case, the main member of the operating rod being mounted in a sleeve on the supplemental member and having a pin in engagement with a slot in said sleeve for limiting the independent rotary movement of said main member.

3. A device for operating at a distance pet cocks and the like including a rotatable operating bar, and means carried by said bar for engaging with a plurality of pet cocks, whereby to successively operate the same when the bar is turned.

4, A device for operating at a distance pet cocks and the like including a rotatable operating bar, and means cooperating with said bar for engaging with a plurality of pet cocks, whereby to successively operate the same when the bar is turned.

In testimony whereof he affixes his signature.

ALBERT W. RAMSEY.